US008661185B2

(12) United States Patent
Thorp et al.

(10) Patent No.: US 8,661,185 B2
(45) Date of Patent: Feb. 25, 2014

(54) ELECTRONIC LIBRARY FOR MANAGING DATA ON REMOVABLE STORAGE DEVICES

(75) Inventors: Tyler Thorp, Sunnyvale, CA (US); Brent Haukness, Monte Sereno, CA (US); Henry Hutton, Tracy, CA (US)

(73) Assignee: SanDisk Technologies Inc., Plano, TX (US)

( * ) Notice: Subject to any disclaimer, the term of this patent is extended or adjusted under 35 U.S.C. 154(b) by 329 days.

(21) Appl. No.: 11/677,388

(22) Filed: Feb. 21, 2007

(65) Prior Publication Data

US 2008/0013411 A1 Jan. 17, 2008

Related U.S. Application Data

(60) Provisional application No. 60/830,560, filed on Jul. 12, 2006.

(51) Int. Cl.
*G06F 12/00* (2006.01)

(52) U.S. Cl.
USPC ........................................... 711/103; 711/115

(58) Field of Classification Search
USPC .......................................... 711/111, 103, 115
See application file for complete search history.

(56) References Cited

U.S. PATENT DOCUMENTS

| | | | |
|---|---|---|---|
| 6,212,512 B1 * | 4/2001 | Barney et al. ...................... 707/1 |
| 6,356,971 B1 * | 3/2002 | Katz et al. ...................... 710/301 |
| 6,594,677 B2 * | 7/2003 | Davis et al. ........................... 1/1 |
| 6,628,537 B1 | 9/2003 | Wallace et al. |
| 6,745,207 B2 * | 6/2004 | Reuter et al. ........................... 1/1 |
| 6,948,016 B2 | 9/2005 | Cedar et al. |
| 7,073,010 B2 * | 7/2006 | Chen et al. .................... 710/313 |
| 7,526,580 B2 * | 4/2009 | Uno ................................ 710/14 |
| 7,809,914 B2 * | 10/2010 | Kottomtharayil et al. ..... 711/170 |
| 2001/0008018 A1 * | 7/2001 | Kamo et al. ................... 713/330 |
| 2002/0059322 A1 | 5/2002 | Miyazaki et al. |
| 2002/0126594 A1 * | 9/2002 | Denda et al. ............... 369/47.12 |
| 2004/0028389 A1 * | 2/2004 | Naohara et al. .................. 386/96 |
| 2004/0039876 A1 | 2/2004 | Nelson et al. |
| 2005/0062888 A1 | 3/2005 | Wood et al. |
| 2005/0080909 A1 * | 4/2005 | Panasyuk et al. ............. 709/229 |
| 2005/0086433 A1 | 4/2005 | Okaue et al. |
| 2005/0099766 A1 * | 5/2005 | Fraley et al. .................. 361/685 |
| 2005/0135790 A1 | 6/2005 | Hutten |
| 2006/0031779 A1 * | 2/2006 | Theurer et al. ................ 715/781 |

OTHER PUBLICATIONS

Windows XP Simple File Sharing, INT Media Group, Jun. 2002, http://web.archive.org/web/20020601164735/http://www.practical-lynetworked.com/sharing/xp/filesharing.htm.*
"SanDisk® Photo Album" brochure dated Sep. 2004.
Specification and drawings of U.S. Appl. No. 11/607,833, filed Dec. 1, 2006 entitled "Method and Apparatus for Seamless Storage and Use of Digital Media", (18 pages).
Office Action issued in U.S. Appl. No. 11/607,833 on Mar. 18, 2009 (21 pages).

* cited by examiner

*Primary Examiner* — Kalpit Parikh
(74) *Attorney, Agent, or Firm* — Brinks Gilson & Lione (57) ABSTRACT

An electronic library for managing data from removable data storage devices is described. The electronic library may have a stand-alone housing with a plurality of receptacles, at least two of the receptacles sized to connect with at least a first type of removable data storage device. An interface positioned on the housing permits concurrent access to removable data storage devices connected with the plurality of receptacles. A data access module in the housing may be configured to emulate a single removable data storage device containing data folders with corresponding to each removable data storage device. A refresh module in the housing may be configured to refresh each memory address of a removable data storage device in communication with one of the plurality of receptacles so that data integrity may be preserved.

34 Claims, 10 Drawing Sheets

ELECTRONIC LIBRARY FOR MANAGING DATA ON REMOVABLE STORAGE DEVICES

CROSS-REFERENCE TO RELATED APPLICATIONS

This application claims the benefit of U.S. Provisional Application Ser. No. 60/830,560, filed Jul. 12, 2006, pending, the entirety of which is incorporated herein by reference.

TECHNICAL FIELD

This application relates to readers of removable data storage devices. More specifically, this application relates to readers of removable data storage devices for managing multiple removable data storage devices concurrently connected with the reader.

BACKGROUND

Removable data storage devices, such as non-volatile memory cards, are used today for a wide variety of purposes. One commonly recognized use for removable data storage devices is in photography. Digital cameras capture images and typically store them on one of a number of types of memory cards, for example a compact flash card. When the compact flash card is full, or when the user wants to access the images currently stored on the compact flash card, it may be removed from the camera and connected to a card reader.

Card readers generally handle a single memory card at a time. Because of the multiple card formats available for removable data storage devices, some card readers may also include the ability to accept several different types of cards. A common way in which memory cards are used in photography is to remove the card from the camera and plug it into a reader. The data on the card is then downloaded onto a computer connected with the reader. The computer hard disk is often considered the primary copy of the data and a back-up copy is made to another storage medium. For example, a CD or DVD may be created to store the back-up copy. The original memory card may then be re-formatted and reused.

A problem with current card readers is the need to physically swap out different memory cards and sequentially download the contents of the memory card if a user has more than one of the same type of memory card to read. Another option is to attach multiple card readers to a host computer so that more than one card may be accessed at any given time. Separate card readers not only add a degree of expense, but they also take up limited input/output (I/O) port connections on a computer. Furthermore, each card reader typically requires a separate drive letter indicator on the host computer and this can cause difficulties in environments where a limited number of drive letters is available due to the presence of network drives and other peripheral drives that each need a drive letter designation.

SUMMARY

In order to address the need for improved access to removable data storage devices, an electronic library for managing a plurality of removable data storage devices is set forth.

According to a first aspect, an electronic library for managing a plurality of removable data storage devices includes a housing having a plurality of receptacles, where each of the receptacles are sized to connect with at least a first type of removable data storage device. An interface is associated with the housing to permit access to removable data storage devices connected with the plurality of receptacles. Additionally, a data access module is positioned in the housing. The data access module may be configured to identify the electronic library to an external device as a single storage device, and to identify each removable data storage device in communication with the receptacles as a respective folder associated with the single storage device.

In yet another aspect, an electronic library for managing and concurrently accessing a plurality of removable data storage devices includes a stand-alone housing having a plurality of receptacles, at least two of the receptacles sized to connect with at least a first type of removable data storage device. An interface is positioned on the housing and permits concurrent access to removable data storage devices connected with the plurality of receptacles. Additionally, a memory refresh module is positioned within the housing and configured to sequentially access each memory address of a removable data storage device in communication with one of the plurality of receptacles so that data integrity may be preserved.

In alternative arrangements, all of the receptacles may be compatible with the same type of removable data storage device so that a group of the same type of removable data storage device, for example a group of compact flash (CF) memory cards, may be concurrently connected with the electronic library. Additionally, visual indicators on the housing may provide information relating to the removable data storage devices connected with the housing.

Other features and advantages of the invention will become apparent upon review of the following drawings, detailed description and claims.

DETAILED DESCRIPTION

Figure 1:
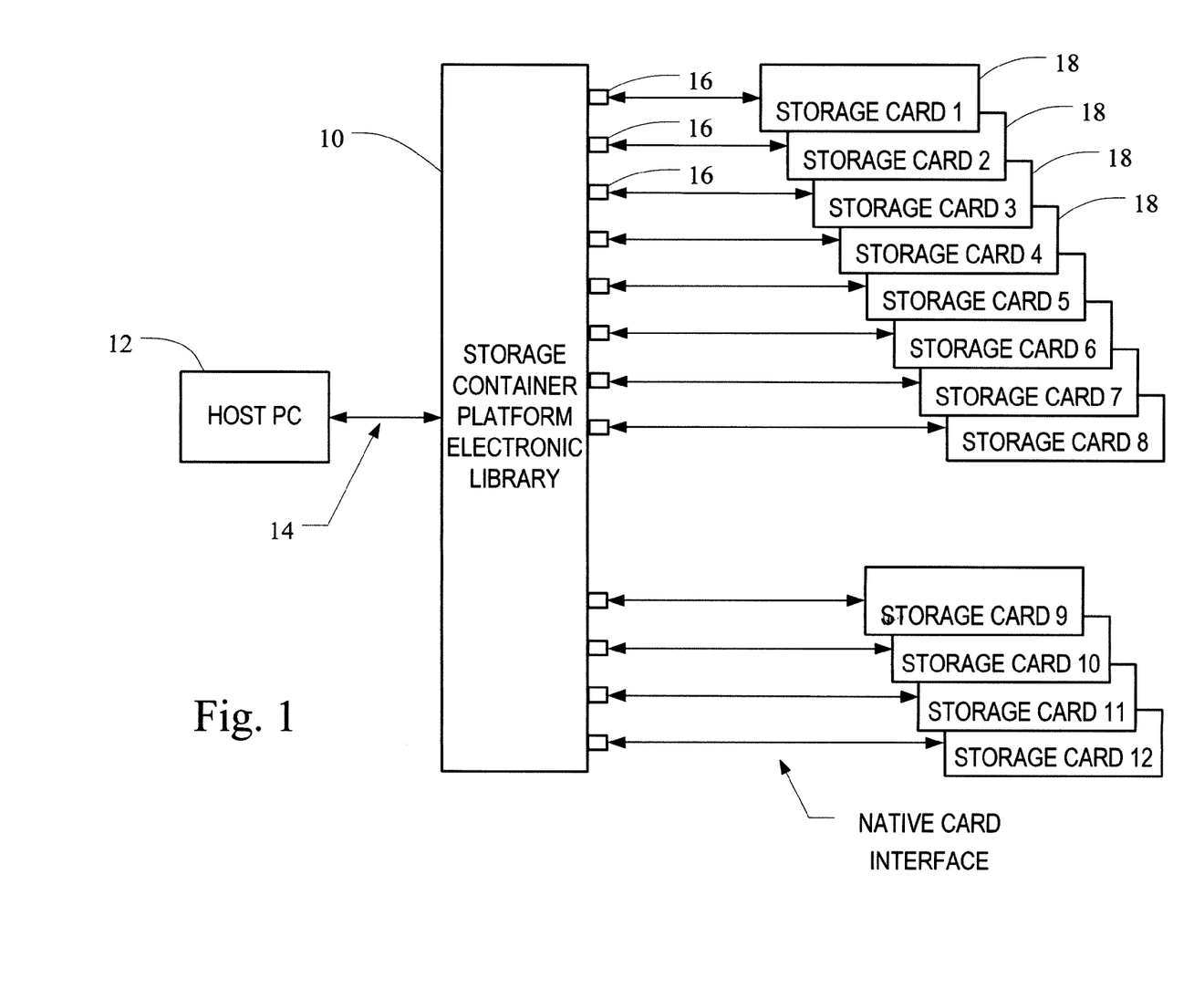
FIG. 1 shows a block diagram of an electronic library in communication with a collection of memory cards and a host computer.

FIG. 1 illustrates a block diagram of an electronic library 10 in communication with a host computer 12 over a communication link 14 allowing communication between the electronic library 10 and host computer 12. The electronic library includes a plurality of receptacles 16 each configured to accept one or more types of removable data storage devices, such as memory cards 18. The receptacles 16 are arranged such that multiple of the same type or form factor of memory card may be simultaneously connected to the electronic library. Each memory card 18 communicates with a respective receptacle 16 using its native card interface. Examples of suitable non-volatile memory cards contemplated for use with detachably connecting to the electronic library 10 include Secured Digital (SD), CompactFlash (CF), Memory Stick (MS), MultiMediaCard (MMC), xD-Picture Card (xD) or SmartMedia (SM) memory cards.

Figure 2:
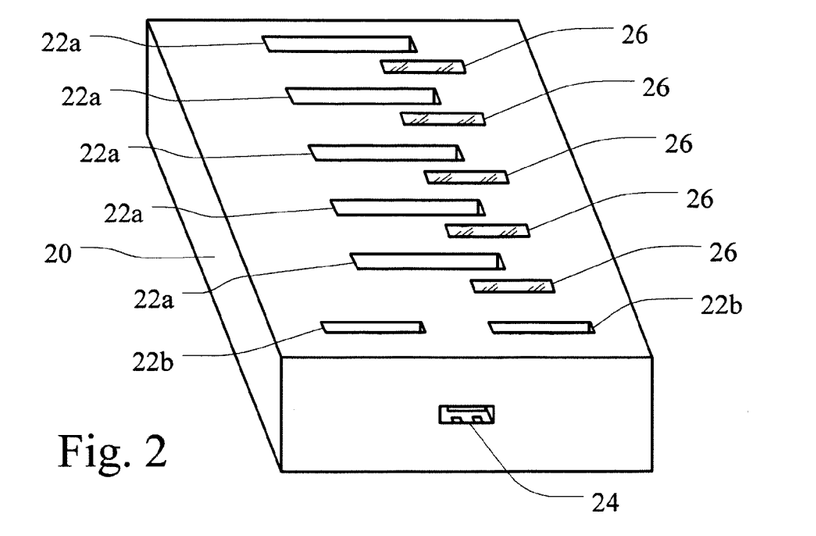
FIG. 2 illustrates an embodiment of an electronic library suitable for use in the system of FIG. 1.

A number of different physical configurations are contemplated for the electronic library 10. Referring to FIG. 2, the electronic library 20 may be arranged with multiple receptacles 22a of a first type and receptacles 22b of a second type arranged along a top surface of the stand-alone housing of the electronic library 20. An input/output (I/O) port 24 may be positioned along a side of the housing. One suitable type of I/O interface 24 is a USB interface. In one embodiment, each of the receptacles 22a, 22b may be positioned next to one or more visual indicators 26. The visual indicator may be configured to identify a particular memory card when data from that memory card is being accessed through the electronic library 20. Any of a number of types of visual indicators may be utilized. For example, a light, such as an LED or an alphanumeric display may be used. In this manner, visual identification of a plurality of memory cards that may be concurrently positioned in the electronic library 20 can easily be made. Additional information may be provided in embodiments where the visual indicator is an alphanumeric display. In one example, a name assigned by a user for the particular memory card may be displayed while the memory card is inserted in a particular receptacle. Alternatively, the file name information or available memory information from a memory card inserted in the adjacent receptacle may be presented.

Figure 3:
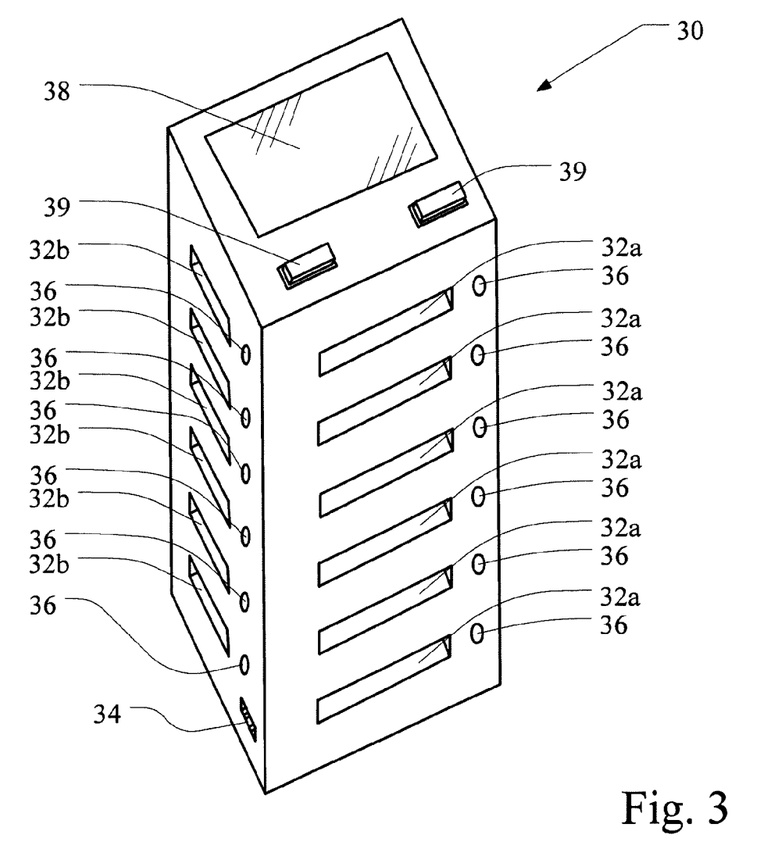
FIG. 3 illustrates a second embodiment of an electronic library suitable for use in the system of FIG. 1.

Other physical configurations of the electronic library are contemplated. Referring to FIG. 3, a version of an electronic library 30 having a vertically oriented arrangement of receptacles is illustrated. One arrangement may include a first type of memory card receptacle 32a along one wall and a second type of memory card receptacle 32b arranged vertically along a second wall of the stand-alone housing. The first and second types of receptacles 32a, 32b may each be configured to accept and communicate with one or more types of memory card interfaces and communicate with a house device, such as a personal computer through an I/O interface 34. Visual indicators 36 may be arranged vertically adjacent respective receptacles to provide a user with a visual reference as to which receptacle is actively accessing or writing to a memory card. As a further convenience, an electronic display 38 with alphanumeric capability may be positioned on a top portion of the electronic library so that additional information regarding a particular memory card may be presented. In one embodiment, display may be an LCD display permitting the user to see the directory information for a selected memory card and/or review a directory tree for a designated memory card positioned in the electronic library. The user command buttons 39 may be positioned adjacent the display 38 to permit selection of a desired receptacle containing a memory card, to toggle through available functions supported by the electronic library, or simply select among specific files of a memory card for display. In other embodiments, it is contemplated that the display 38 and command buttons 39 may be used with or without the visual indicators 36 in many of the physical storage embodiments discussed herein.

Figure 4:
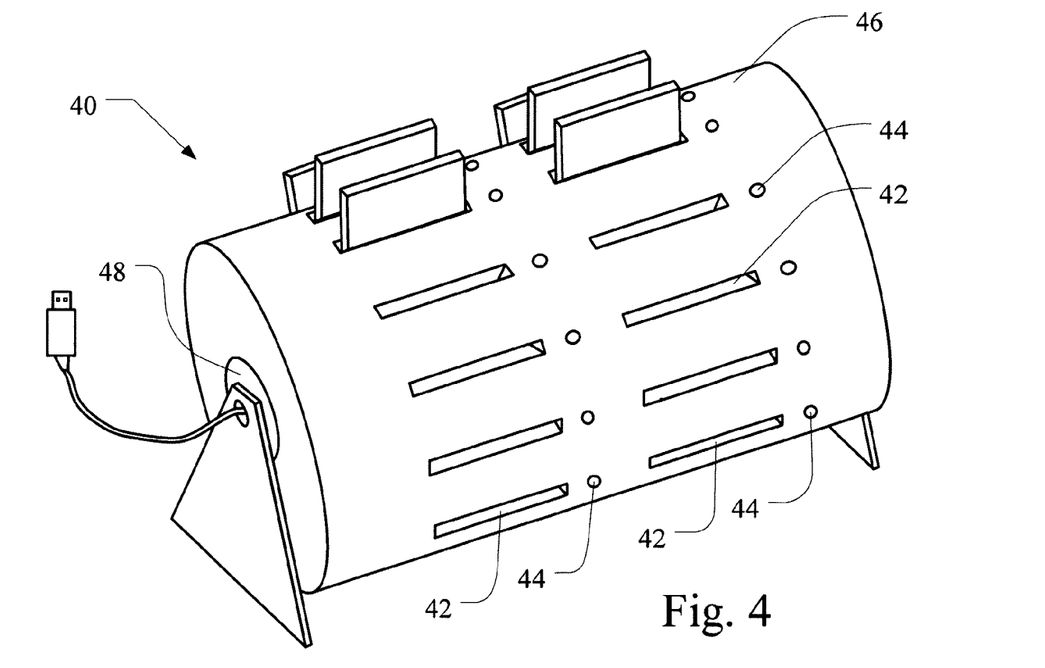
FIG. 4 illustrates a third embodiment of an electronic library suitable for use in the system of FIG. 1.
Figure 5:
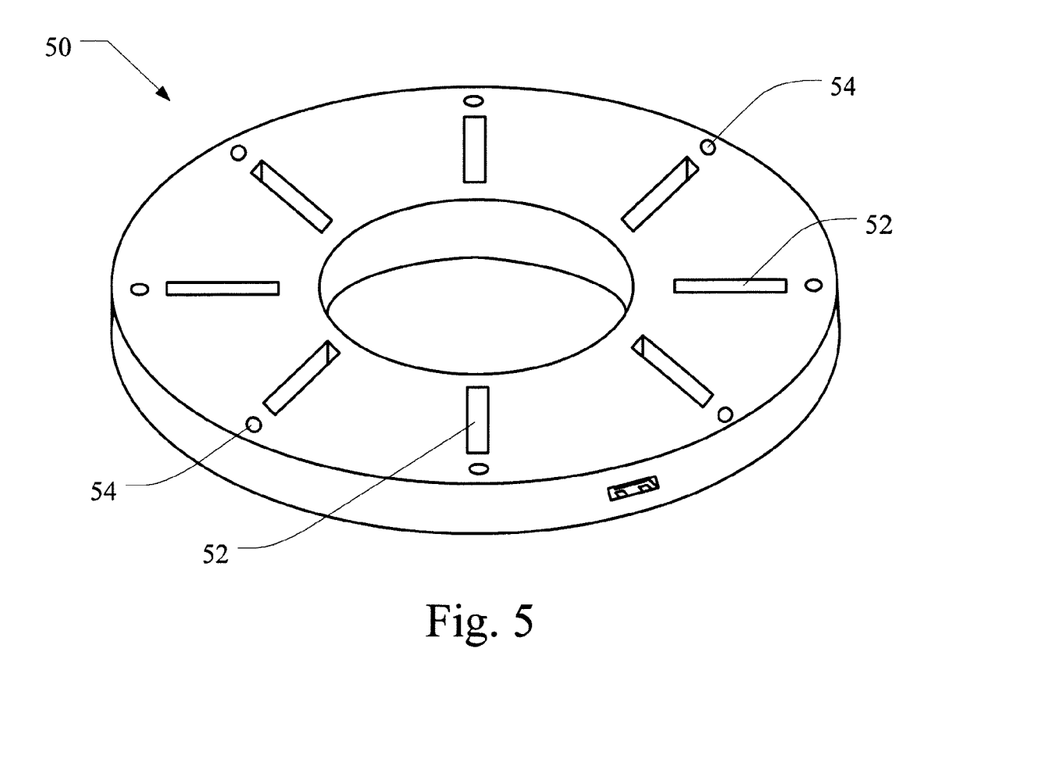
FIG. 5 illustrates a fourth embodiment of an electronic library suitable for use in the system of FIG. 1.

Other physical forms for electronic library may be implemented in order to provide different types of physical contacts and familiarity to the user. An example of an embodiment of the electronic library 40 where receptacles 42 and visual indicators 44 are positioned around all or part of the circumference of a cylindrical housing 46 is shown. The cylindrical housing 46 may be rotatable about an axis 48 through which an I/O port for connection to a host device is located. Yet another physical form factor for the electronic library is illustrated in FIG. 5. Electronic library 50 in FIG. 5 is shown as an annular, or carousel-shaped device. A plurality of receptacles 52 are arranged along a top surface.

Visual indicators 54 maybe arranged adjacent respective receptacles and function in the same manner as described with reference to the embodiments of FIGS. 2-4. The carousel-shaped electronic library 50 may be a static housing or may include a rotatable portion containing the receptacles so that memory cards and receptacles may be rotated to a specific physical point along the carousel to physically select which memory card is to be accessed. Alternatively, the carousel-shaped electronic library 50 may be static and selection of a memory card may be made through a host computer or command button (not shown) similar to that of the electronic library 30 of FIG. 3.

Figure 6:
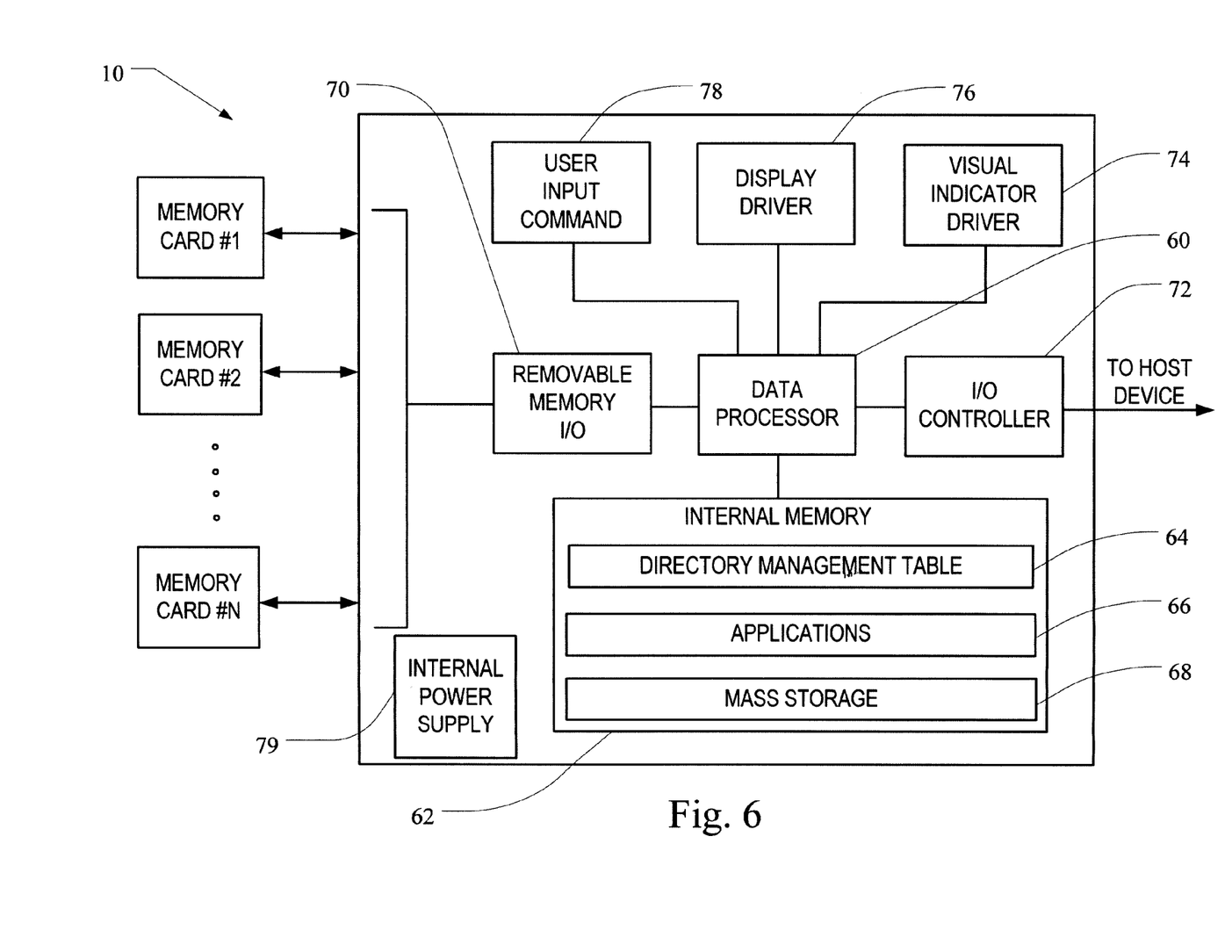
FIG. 6 is a functional block diagram of an electronic library suitable for use in the system of FIG. 1.

Referring to FIG. 6, the circuitry within the electronic library may include a data processor 60 in communication with an internal memory 62. The internal memory may contain a directory management table 64 for tracking directory information obtained from one or more memory cards connected with the electronic library 10. The internal memory 62 may also include an applications module 66 containing processor executable instructions for the data processor 60. Internal memory may also include mass storage 68. A removable memory I/O controller 70 mediates data exchanges with each of the memory cards connected with the electronic library 10. The controller 70 may include interface handling capabilities for each of a number of different memory card formats. Similarly, an I/O controller 72 for communicating with a host device is controlled by the data processor 60. The I/O controller 72 may be configured for any of a number of formats, such as the USB interface discussed above. Alternatively, the I/O controller 72 may be implemented using other formats such as IEEE1394 (fire-wire), serial ATA, SCSI, wireless USB, or any of a number of mass storage device interfaces. Ethernet and WiFi protocols are also contemplated. In applications utilizing wireless protocols, the transmit and receive device may be integrated within the housing of the electronic library 10 or maybe separately attached.

A visual indicator driver 74 communicates with the data processor to operate the appropriate one or more visual indicators relating to connected memory cards. A display driver 76 is provided to interface with one or more alphanumeric displays which may be associated with the electronic library 10. Additionally, a user input command interface 78 communicates with the data processor to transmit physical user selections from input sources, such as the user command buttons 39 illustrated in FIG. 3, through the data processor 60.

Power for operating the electronic library 10 may be received through a single connection with a host device, such as through the USB or other interface used to communicate with the host device, or may be received through a separate power supply (not shown) connectable with the electronic library. Alternatively, a power supply 79 may be contained within the housing, without the need for any external supply or wired connection. Removable batteries, either rechargeable or non-rechargeable, may be used as the power supply in one embodiment.

Utilizing the processing system illustrated in FIG. 6, several examples of data display or organization are described below. In order to reduce the use of drive letters displayed on a host device interface, in one embodiment the applications module 66 of the internal memory 62 includes instructions for gathering directory information for each memorable data storage device, such as memory cards, attached with the electronic library. The instructions may include assigning each separate removable data storage device a folder name so that each of the removable data storage devices currently connected with the electronic library will be presented to the host device via a single drive letter, representing the electronic library itself, containing individual folders, wherein each folder represents one of the removable data storage devices and contains within that folder directories and/or other contents of the particular removable data storage device.

Figure 7:
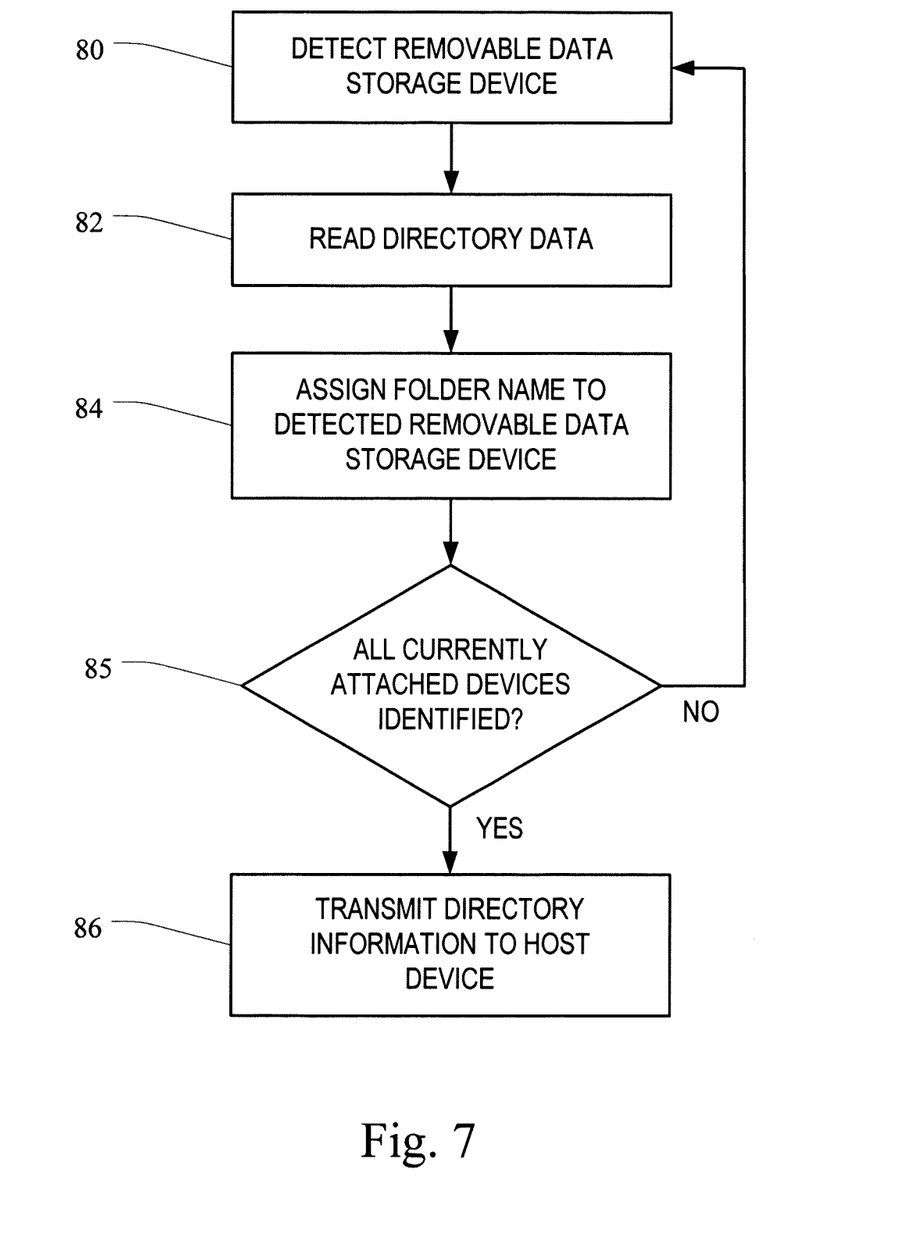
FIG. 7 is a flow chart illustrating a method of managing directory information and data with the electronic library of FIGS. 1-6.

One method, as illustrated in FIG. 7, may include detecting a removable data storage device via the removable memory I/O controller 70 (at 80). The data processor may then read directory data from the detected removable data storage device (at 82) and assign a folder name to the removable data storage device (at 84). The assigned folder name and the data directory from the removable data storage device may then be stored in the directory management table 64. If all the currently attached removable data storage devices have been identified, the data processor 60 transmits the directory information for the entire electronic library to the host (at 86). If additional removable data storage devices have not yet been identified, the process repeats itself until all attached memory cards are accounted for (at 85).

If multiple electronic libraries are daisy-chained in series via consecutive connections through the host device I/O port (or additional I/O ports, such as USB ports, which may be positioned on the housing of each electronic library), the first electronic library (i.e. that one which is in direct communication with the host computer without intervening electronic libraries) may represent each subsequently connected electronic library as a folder. The removable data storage devices attached to the daisy-chained electronic library may be represented to the host computer by the first electronic library as separate folders or sub-folders within the folder representing the daisy-chained electronic library.

In an alternative embodiment, reduction of the drive letter usage at a host device may be accomplished by simply downloading to the mass storage 68 in the internal memory all of the data from each of the connected removable data storage devices. As illustrated FIG. 8, the application module 66 may contain instructions for the processor 60 to detect removable data storage devices (at 90) and subsequently copy all data from that removable data storage device into the mass storage of the electronic library (at 92). Subsequently, a query from a host device to the electronic library would result in the electronic library acting as a single mass storage device having multiple folders. An example of a graphic user interface in a WINDOWS environment displaying the single drive letter format provided by the electronic library is shown in FIG. 9. The directory screen 100 illustrates a single drive letter address 102, in this instance "E:\" where each of the different removable data storage devices is shown as a folder 104 within the "E" drive. A user may freely edit folder names 106 using the same folder level tools available through the WINDOWS graphic user interface. Changes at a host device of the folder names would be reflected in a change in the internal memory 62 and appropriate memory card attached to the electronic library 10.

Figure 8:
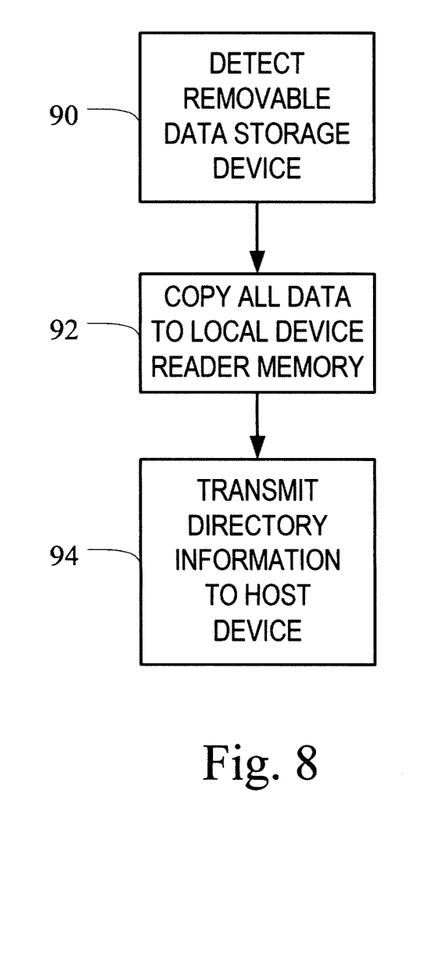
FIG. 8 is a flow chart illustrating an alternative embodiment of the method of FIG. 7.
Figure 9:
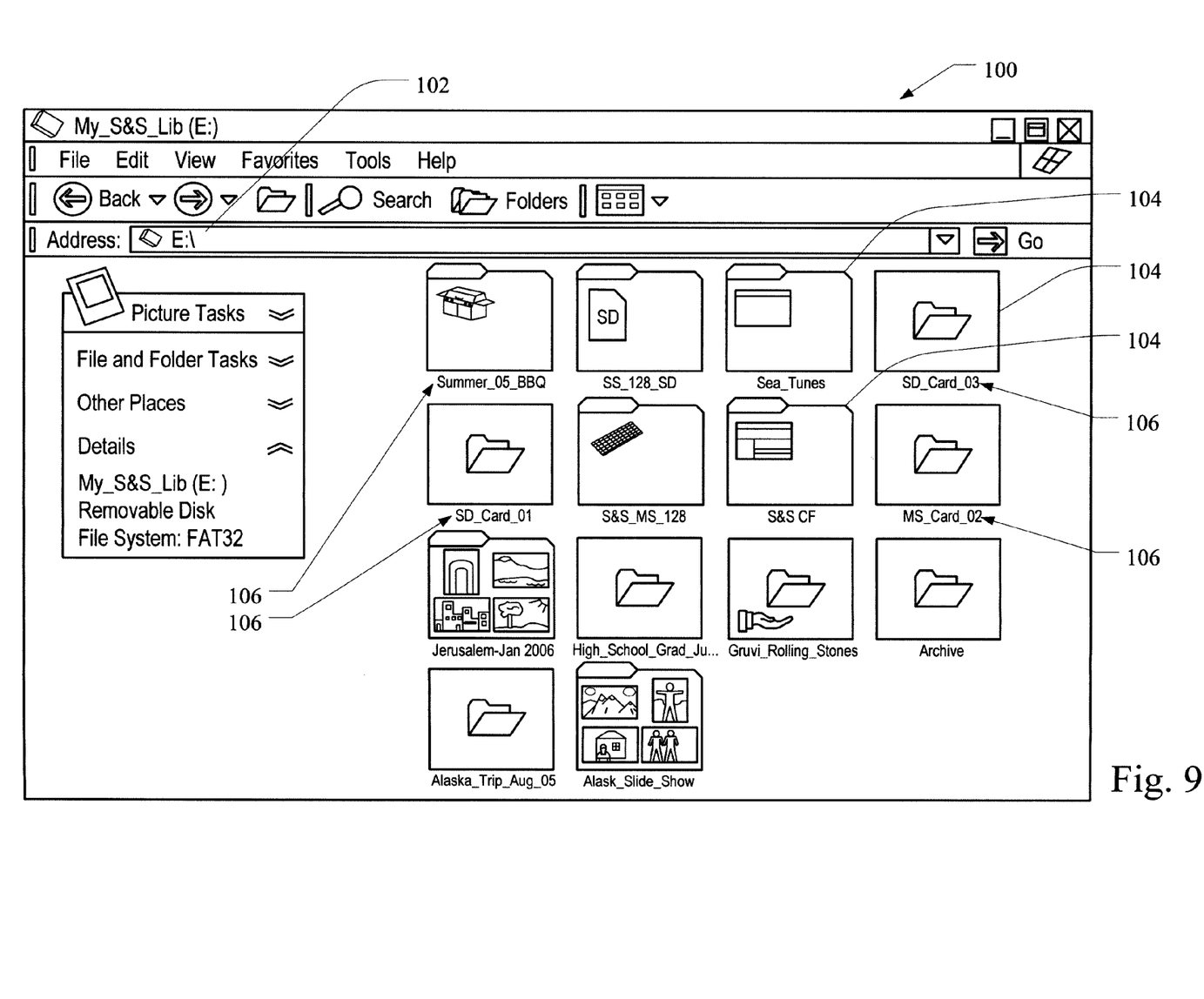
FIG. 9 is a screen shot of a graphic user interface on a host computer implementing a WINDOWS environment displaying the single drive letter format provided by the methods of FIGS. 7 and 8.

Utilizing either of the methods of FIGS. 7 or 8, the electronic library may function as a computing platform that, when connected to a host, emulates a removable disk of a capacity determined by the cumulative capacities of the attached removable data storage devices, if a translation table is used as in FIG. 7, or of a fixed capacity determined by the mass storage capability of the electronic library if the entire contents of all attached removable data storage devices are copied within the electronic library as represented by the process of FIG. 8. In either implantation, physical removal of a removable data storage device from the electronic library may automatically initiate complete or partial removal of the directory data from the electronic library. For implementations where the entirety of the contents was copied to the electronic library, those contents may be erased automatically. In other implementations, the name and/or directory information (e.g. one or more of the FAT tables, partition tables and directory entries) may be retained in memory in the electronic library.

An example of another application for which instructions may be stored in the application module 66 of the electronic library 10 is a data refresh feature. With or without the ability to concurrently access multiple removable data storage devices of the same form factor, long-term data viability is a desirable aspect of any data storage medium. With the ability provided by embodiments of the electronic library having concurrent access to multiple removable data storage devices of the same and different form factors, it is envisioned that the removable data storage device, itself, may be used as a primary source of data and/or an even more viable archival storage device than storage media such as CDs or DVDs. With periodic data refresh steps taken, removable data storage such as compact flash or other flash memory devices may provide for improved reliability in long-term storage applications.

Figure 10:
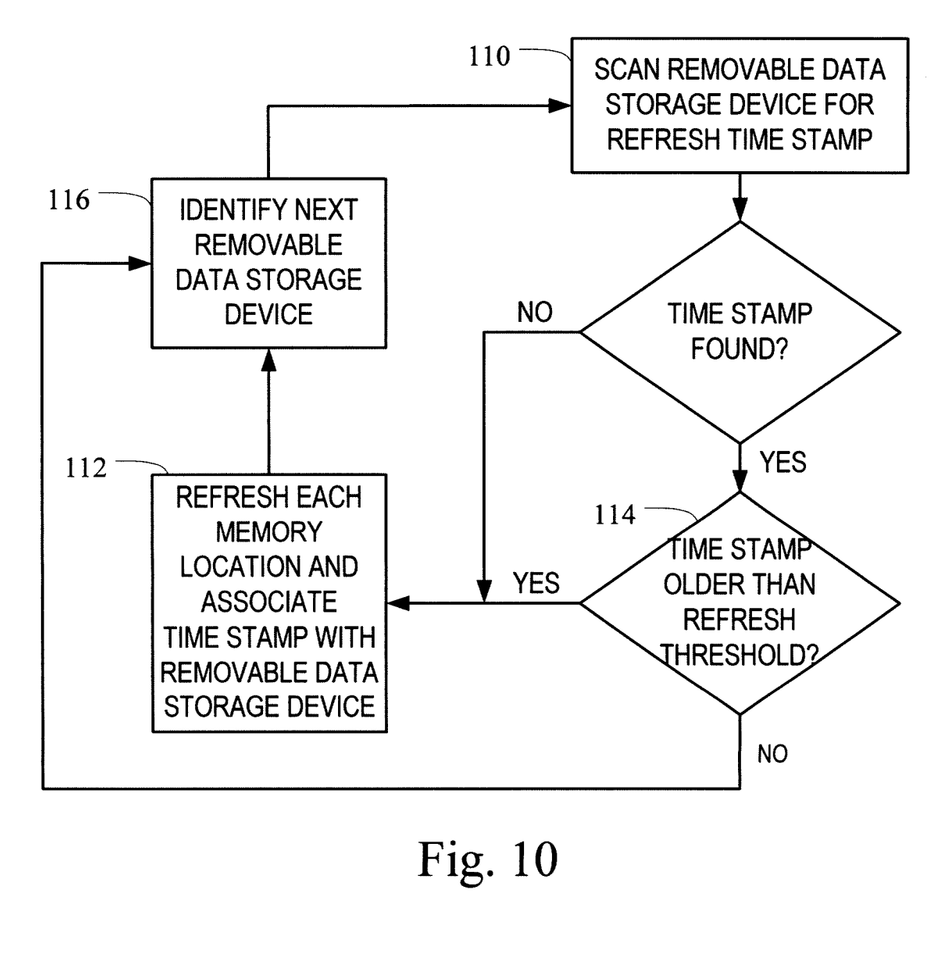
FIG. 10 is a flow chart illustrating a method of preserving data integrity in removable data storage devices connected with the electronic library of FIGS. 1-6.

As illustrated in FIG. 10, one example of a method for refreshing data on attached removable data storage devices is shown. In this method, the electronic library would scan a removable data storage device and determine a time stamp associated with that removable data storage device (at step 110). If the time stamp is not discovered to be associated with the removable data storage device, the processor would refresh each memory location in the removable data storage device and associate a time stamp with that device for future reference. Such a refresh task may be accomplished through a simple sequential processing of each data storage location on the removable data device (at 112). Alternatively, if a time stamp is found associated with the removable data storage device, that time stamp may be compared with a refresh time threshold maintained in the internal memory 62 of the electronic library 10 (at 114). If the time stamp associated with the removable data storage device is greater than the threshold then each memory location in that removable data storage device would be refreshed and the time stamp reset (at 116). Alternatively, if the time stamp identified for the particular removable data storage device had not exceeded the refresh time threshold then the next removable data storage device would be identified and scanned. In different embodiments, the refresh method described in FIG. 10 may be a continuous process, may be implemented while data access activities are idle, may be set to execute at specified time periods, or may be manually chosen by a user through a host computer user interface.

It is contemplated that the intelligence for executing the methods described above will be resident on the electronic library itself. The application module of the internal memory may contain multiple applications in firmware, software code, or one or more application specific integrated circuits (ASICs). In one embodiment, one or more functions of the application software may be upgraded or configured remotely via a host computer device. In yet other arrangements, one of more of the applications may be stored on the host computer device, either for access by the electronic library as needed, or for execution by the host computer to relieve the electronic library of some processing overhead. The application software, in implementations where all or a portion resides on the host computer, may be integrated in a separate driver software application associated with the electronic library.

Figure 11:
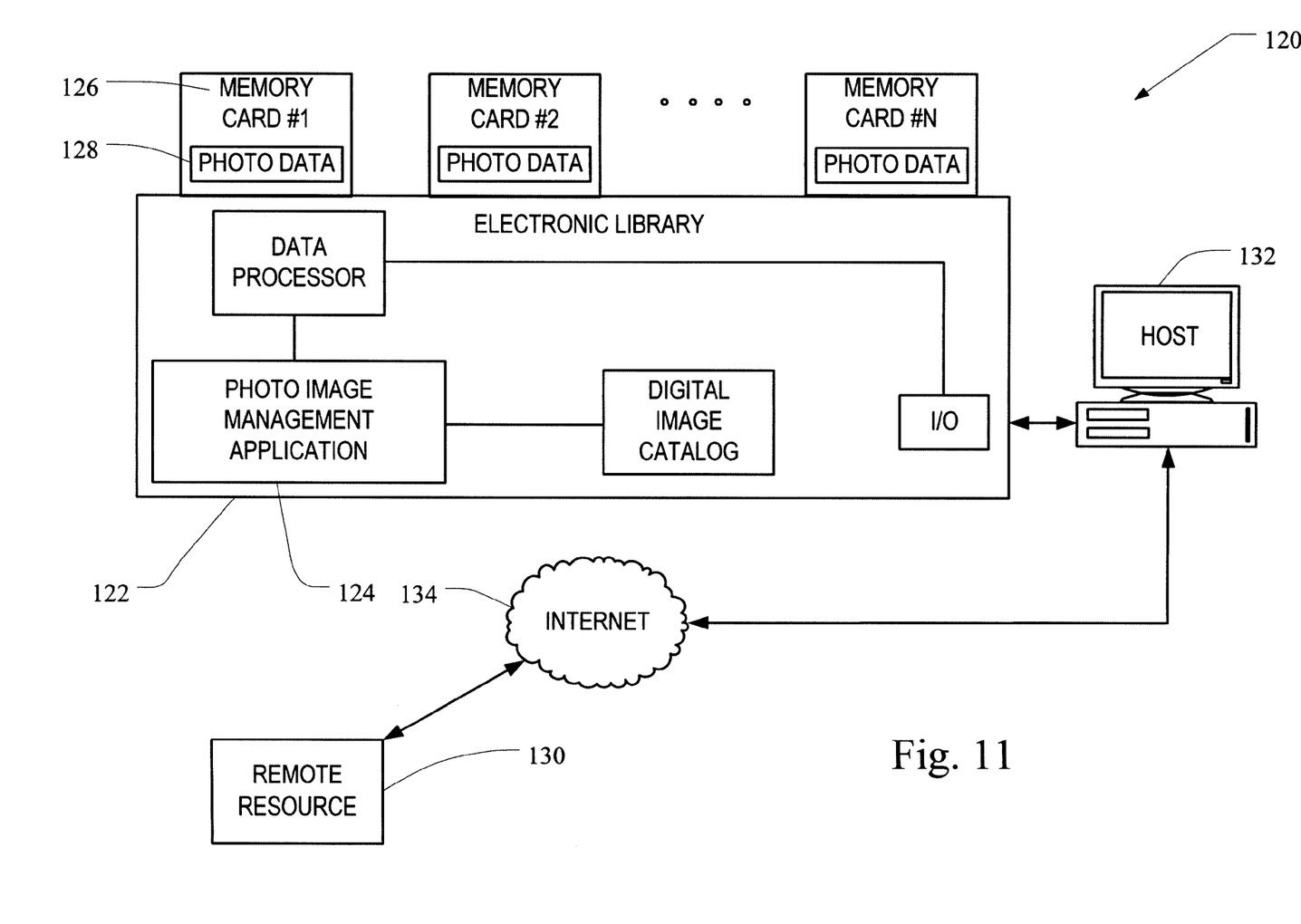
FIG. 11 illustrates a system for managing digital image data using an electronic library such as described with respect to FIGS. 1-10.

Referring to FIG. 11, a system 120 for managing digital image data is shown. Using features of the systems and methods described above, an electronic library 122 configured with a photo image management application 124 may allow a user to maintain all of their memory cards 126 with digital photography data 128 in one place. Rather than ejecting the memory card from the camera, downloading data from the memory card to another storage device, reformatting the memory card (or simply placing the used memory card in a box) and copying the downloaded data to yet another storage medium (e.g. burning data to a CD or DVD), a more automated and efficient procedure may be implemented. Each time a new memory card 126 is full, the user may insert and leave the memory card in the electronic library 122, the photo image management application 124 may automatically catalog the new photography data 128 and inventory the entire library of memory cards connected with the electronic library.

The photo image management application may also automatically communicate with the host computer 132, or with remotely located resources 130 via the host computer 132 and the Internet 134. Examples of remote resources may be photo printing services or a storage area network having offsite back-up storage files for the users photography data. The electronic library 122 may automatically organize newly added memory cards 128 upon detection of their connection to a receptacle on the electronic library. The detection and identification of a new memory card may also lead to the electronic library establishing a connection to remote resources 134 and prompting the user at the host computer to select an option, or simply carrying through and automatically executing a pre-approved service option at the remote resource.

Figure 12:
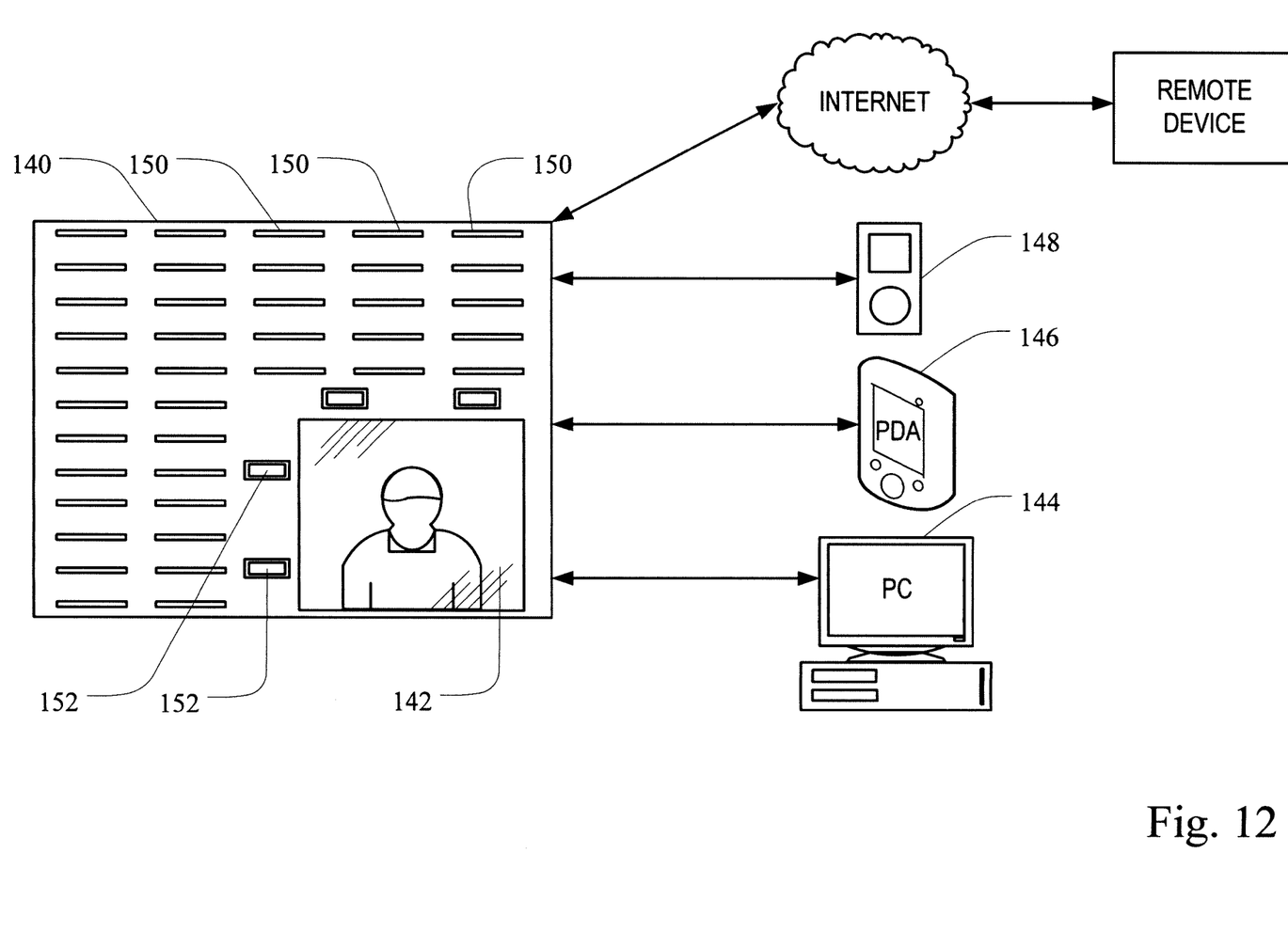
FIG. 12 illustrates an alternative embodiment of the system of FIG. 11.

In other applications, the electronic library may be configured with a digital photo album application to assemble a catalog or inventory of all photos contained each of the assorted removable data storage devices connected with the electronic library. Referring to FIG. 12, the electronic library 140 may provide a vehicle with which to aggregate and sort the digital photo data and create one or more photo albums viewable on a display 142 associated with the electronic library 140 itself or a remote device in communication with the electronic library. The remote device may have its own processor capability, for example a personal computer 144, a device with limited processing power, such as a PDA 146 or a simple data retrieval or display device, bypassing the need for separate processor/computer altogether, for example an MP3 player 148 with a display. The remote device may be connected with the electronic library directly, or over a network such as the Internet. The electronic library 140 may have multiple receptacles 150 for concurrently connecting to multiple removable data storage devices arranged in any of a number of configurations, such as those discussed with respect to FIGS. 1-5 above.

Also, the electronic library 140 may access from a remote device, or hold in its own internal memory without the need for connection to a separate remote device, appropriate photo album applications having the functionality to permit creation of a photo album on the electronic library. As discussed with the embodiment of FIG. 3, one or more user command inputs 152 positioned directly adjacent one or more edges of the display 142, or elsewhere on the housing, may permit access and manipulation of photo data from each removable data storage device. A user interface permitting selection and arrangement of specific photos into a new collection, catalog or album may be displayed on the display 142. When a user is satisfied with the created photo album, the album may then title and store the user-created album or albums in mass storage within the electronic library 140.

The photo albums created on the electronic library 140 may be in various forms. In one embodiment, the album may be saved in the form of a directory or table identifying the specific memory locations on the various removable data storage devices connected with the electronic library. In this embodiment, an album may be shared with a remote device by transmitting the directory to the remote device and allowing the remote device to access each photo in the album directory directly from each relevant removable data storage device in the electronic library on demand when a user selects a photo title. A variant of the directory-type photo may include saving the directory of the album as described above and, when sending the album to a remote device, assembling the album by sequentially accessing the photo data identified in the directory/table directly from each relevant removable data storage device. A separate copy of the photo data in mass storage for the electronic library is unnecessary. In yet another embodiment, a copy of each selected photo for an album may be made and stored in mass storage on the electronic library at the time the photo album is first created. The album data may then be transferred as a file or folder to a remote device with a remote device. In other embodiments, the electronic library with photo album capability may include an interface and video driver for driving a display device directly, for example a computer monitor or a television.

Although examples of a photo album application are specifically called out above, other data types may also be aggregated, organized and cataloged with the electronic library. For example, video data or audio data such as MP3 files may be arranged in albums or files and shared. The electronic library may be fabricated with additional interfaces for playing video or audio to allow creation of the album or collection. Similarly, data unrelated to photos, video or audio may be organized and compiled into groupings or files that may be shared with remote devices. One example of this type of data is contact information. Names, addresses, organizational affiliations and so on may be used by a user to organize files or folders of data in the electronic library. As with the photo album example, the data on the removable data storage devices may be retained and preserved in their original state, while permitting access and organization through the electronic library.

Figure 13:
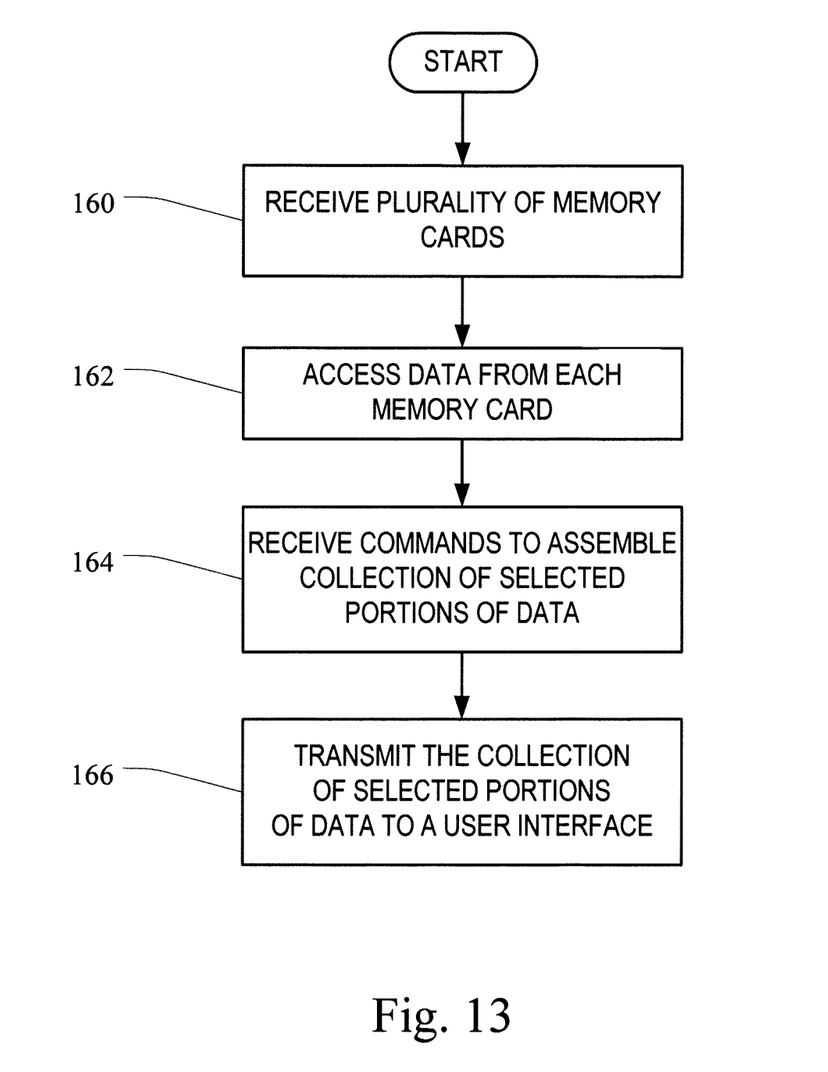
FIG. 13 is a flow chart illustrating a method of organizing a catalog or album of selected portions of data from the data stored in removable data storage devices connected with an electronic library such as shown in FIG. 3.

Referring to FIG. 13, the album or cataloging application of the electronic library essentially follows the process of first receiving more than one removable data storage device, such as a memory card (at 160) and accessing data from each memory card (at 162). Implementing an appropriate photo album or other type data organizing application resident on the electronic library, the electronic library will receive and implement commands from users to arrange selected data from one or more of the memory cards into an album or other cataloged collection (at 164). This album or catalog will then be transmitted to a user interface, including alphanumeric, video audio or other interface appropriate for presenting the particular data, for display (at 166).

From the foregoing, a method and system for providing an electronic library for concurrently handling multiple memory cards of the same form factor has been described. The electronic library may be configured to support one or more files systems for managing files, for example FAT, NTFS, MFS or any other known file systems. All memory card directory and data information may be presented to a host computer in a file folder format rather than assigning each memory card a separate drive letter designation. Previously loose or reused memory cards may be physically and electronically organized in a way that can reduce the number of data copies made and preserve the data integrity of information on the memory cards. Also, the electronic library may be used as a platform to removably connect various applications or content protected data. For example, data protected using technologies such as digital rights management techniques or TrustedFlash technology is generally unavailable for copying onto a hard-drive. The electronic library described herein may provide a more convenient platform within which these technologies may be used. The electronic library described herein may also be configured for use in cataloging, or creating albums of, user selected portions of data from the removable data storage devices, with or without a separate computer.

It is therefore intended that the foregoing detailed description be regarded as illustrative rather than limiting, and that it be understood that it is the following claims, including all equivalents, that are intended to define the spirit and scope of this invention.

We claim:

1. An electronic library for managing a plurality of removable data storage devices, the electronic library comprising:
    a housing having a plurality of receptacles, wherein each of the receptacles is sized to connect with one or more types of removable data storage devices;
    a host communication interface configured to removably connect the electronic library as a peripheral device with a host electronic device, the host electronic device being external to the housing;
    memory interface circuitry configured to detect the plurality of removable data storage devices via the receptacles; and
    a data access module positioned in the housing and in communication with the memory interface circuitry, the data access module configured to:
        in response to the memory interface circuitry detecting one or more of the plurality of removable data storage devices, for each of the plurality of removable storage devices:
            communicate with a respective removable data storage device in order to obtain directory information from the respective removable data storage device;
            assign a folder name to the respective removable data storage device; and
            assign the directory information within the folder name for the respective removable data storage device;
        emulate to the host electronic device a single removable data storage peripheral device including the assigned folder names and the directory information, wherein each assigned folder name identifies the respective removable data storage device in order to present the single removable data storage peripheral device to the host electronic device as a single drive and to present the plurality of removable data storage devices to the host electronic device as the assigned folder names within the single drive so that plurality of removable data storage devices are consolidated into the single drive rather than separate drives; and
        send, via the host communication interface, the emulation of the single removable data storage peripheral device to the host electronic device,
    wherein the electronic library is connected to a second electronic library in a series daisy chain;
    wherein the electronic library is in communication with the host electronic device without intervening electronic libraries;
    wherein the second electronic library is in communication with the host electronic device through the electronic library; and
    wherein the data access module is configured to represent to the host electronic device the second electronic library as a separate folder and represent one or more data storage devices connected to the second electronic library as sub-folders to the separate folder.

2. The electronic library of claim 1, wherein the data access module comprises a computer-readable memory comprising processor-executable instructions for configuring a processor to identify the electronic library to the host electronic device as the single removable data storage peripheral device, and to identify each removable data storage device in communication with the receptacles as the respective assigned folder name associated with the single removable data storage peripheral device.

3. The electronic library of claim 1, wherein the data access module comprises a memory positioned in the housing, configured to receive-data from the plurality of removable data storage devices connected with the receptacles, and configured to represent the data as contained within one of the assigned folder names.

4. The electronic library of claim 3, wherein the memory is further configured to delete the data received from a particular one of the plurality of removable data storage devices upon removal of the particular one of the plurality of removable data storage devices from the electronic library.

5. The electronic library of claim 1, wherein the one or more types of removable data storage devices comprises a non-volatile memory.

6. The electronic library of claim 5, wherein the non-volatile memory comprises one of a Secure Digital (SD), CompactFlash (CF), Memory Stick (MS), MultiMediaCard (MMC), xD-Picture Card (xD) or SmartMedia (SM) memory card.

7. The electronic library of claim 1, further comprising a data access indicator associated with the housing, the data access indicator configured to identify a particular removable data storage device when data from the particular removable data storage device is being accessed.

8. The electronic library of claim 7, wherein the data access indicator comprises a visual indicator.

9. The electronic library of claim 8, wherein the visual indicator comprises an alphanumeric display.

10. The electronic library of claim 8, wherein the visual indicator comprises a plurality of light emitting devices, each light emitting device positioned adjacent a respective one of the plurality of receptacles.

11. The electronic library of claim 1, wherein the host communication interface comprises an electronic library-host device interface associated with the housing, the electronic library-host device interface configured to permit communication between the electronic library and the host electronic device.

12. The electronic library of claim 11, wherein the electronic library-host device interface comprises a USB interface.

13. The electronic library of claim 1, wherein the electronic library is configured as a peripheral device separate from the host electronic device.

14. The electronic library of claim 1, wherein the host electronic device is a computer.

15. The electronic library of claim 1, wherein the memory interface circuitry comprises a memory input/output controller configured to mediate data exchanges with each of the plurality of data storage devices; and further comprising a host input/output controller in communication with the data access module and configured to communicate with the host electronic device via the host communication interface.

16. The electronic library of claim 1, wherein the electronic library is configured to receive power from the host electronic device via the host communication interface.

17. The electronic library of claim 1, wherein the data access module is further configured to:

receive an instruction from the host electronic device to modify at least one assigned folder name, the instruction generated by the host electronic device operating system; and in response to receiving the instruction, modify the at least one assigned folder name based on the instruction.

18. The electronic library of claim 17, wherein the data access module is further configured to instruct a respective data storage device to modify at least one folder name based on the instruction.

19. The electronic library of claim 18, wherein the data access module is further configured to transmit the assigned folder names and the assigned directory information to the host electronic device.

20. A method for managing a plurality of removable data storage devices, the method comprising:

in a peripheral device:

receiving via receptacles of a removable data storage device reader a plurality of removable data storage devices;

detecting one or more of the plurality of removable data storage devices received via the receptacles;

in response to detecting the one or more of the plurality of removable data storage devices:

communicating with a respective removable data storage device in order to obtain directory information from the respective removable data storage device;

assigning a folder name to the respective removable data storage device; and assigning the directory information within the folder name for the respective removable data storage device;

emulating to a host electronic device a single removable data storage peripheral device including the assigned folder names and the directory information, the host electronic device being external to a housing of the removable data storage device reader; and sending, via a host communication interface, the emulation of the single removable data storage peripheral device to the host electronic device, wherein each assigned folder name identifies the respective removable data storage device in order to present the single removable data storage peripheral device to the host electronic device as a single drive and to present the plurality of removable data storage devices to the host electronic device as the assigned folder names within the single drive so that plurality of removable data storage devices are consolidated into the single drive rather than separate drives, wherein the peripheral device comprises an electronic library, wherein the electronic library is connected to a second electronic library in a series daisy chain wherein the electronic library is in communication with the host electronic device without intervening electronic libraries, wherein the second electronic library is in communication with the host electronic device through the electronic library, and wherein the second electronic library is represented to the host electronic device as a separate folder and one or more data storage devices connected to the second electronic library are represented to the host electronic device as sub-folders to the separate folder.

21. The method of claim 20, wherein emulating to the host electronic device the single removable data storage peripheral device comprises creating a directory table in a memory within the removable data storage device reader, the directory table including the directory information from each of the plurality of removable data storage devices.

22. The method of claim 20, wherein emulating to the host electronic device the single removable data storage peripheral device comprises copying all data from each of the plurality of removable data storage devices to a memory within the removable data storage device reader, 23. The method of claim 20, wherein emulating to the host electronic device the single removable data storage peripheral device comprises representing a single drive designator to the host electronic device regardless of a number of removable data storage devices currently attached to the removable data storage device reader.

24. The method of claim 20, wherein the plurality of removable data storage devices comprise non-volatile memory.

25. The method of claim 24, wherein the non-volatile memory comprises a Secure Digital (SD), CompactFlash (CF), Memory Stick (MS), MultiMediaCard (MMC), xD-Picture Card (xD) or SmartMedia (SM) memory card.

26. The method of claim 20, further comprising identifying a specific one of the plurality of removable data storage devices with a visual indicator on the removable data storage device reader when data from the specific one of the plurality of removable data storage devices is accessed.

27. The method of claim 26, wherein identifying comprises displaying information on an alphanumeric display.

28. The method of claim 27, wherein displaying information comprises displaying a name of the specific one of the plurality of removable data storage devices.

29. The method of claim 27, wherein displaying information comprises displaying one of a file name or available memory of the specific one of the plurality of removable data storage devices.

30. The method of claim 20, wherein the peripheral device is separate from the host electronic device; and
    wherein emulating to the host electronic device is via a removable data storage device reader-host device interface.

31. The method of claim 20, further comprising, in the peripheral device, receiving power from the host electronic device.

32. The method of claim 20, further comprising:
    receiving an instruction from the host electronic device to modify at least one assigned folder name, the instruction generated by the host electronic device operating system; and
    in response to receiving the instruction, modifying the at least one assigned folder name based on the instruction.

33. The method of claim 32, further comprising instructing a respective data storage device to modify at least one folder name based on the instruction.

34. The method of claim 33, further comprising transmitting the assigned folder names and the assigned directory information to the host electronic device.

\* \* \* \* \*